WOLFGANG WITTE
INVENTOR.

United States Patent Office 3,448,276
Patented June 3, 1969

3,448,276
CONDENSER-TYPE OPTICAL SYSTEM WITH CONICAL LIGHT PIPING MEMBER FOR RADIATION DETECTOR
Wolfgang Witte, Uberlingen (Bodensee), Germany, assignor of one-half to Bodenseewerk Perkin-Elmer & Co. G.m.b.H., Uberlingen (Bodensee), Germany
Filed Feb. 7, 1966, Ser. No. 525,629
Claims priority, application Germany, Feb. 9, 1965, B 80,434
Int. Cl. H01j 3/14
U.S. Cl. 250—216          10 Claims

ABSTRACT OF THE DISCLOSURE

It has already been proposed to utilize a conical light pipe member (having its narrower end toward the detector) for concentrating incoming radiant energy onto a radiation detector. Where the detector is of the type in which the element actually receiving and responding to the radiant energy is deep within the detector (for example, well within an enclosure, sealed by a transparent window), an efficient conical light pipe cannot be directly coupled to the detector. In particular, the image reduction ability of light pipe must be compromised (i.e., by utilizing a very slowly tapering cone) if much of the radiation is not to miss the detector element. The present improvement provides reflective means surrounding the window (and preferably also the other internal surfaces of the detector) so as to provide an auxilliary or coupling light pipe between the original conical light pipe member and the element. This auxilliary reflective means may be generally conical (i.e., tapering), cylindrical, or a combination of both tapering and non-tapering sections.

---

Figure 1:
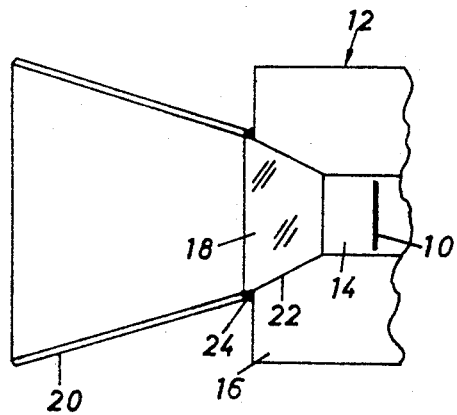

This invention relates to an improved condensing optical system for concentrating a beam of light on a radiation detector, which condensing system includes a conical light pipe member.

The signal-to-noise ratio of conventional radiation detectors increases as the area of the detector surface decreases. In measuring instruments the radiation is concentrated as much as possible; for instance, in many optical instruments the exit slit is imaged in a reduced (i.e., demagnified) manner onto the detector. This is particularly important in infrared instruments, since the available energy is often relatively small, so that the noise level of the detector becomes the limiting factor. With conventional optical imaging this reduction (demagnification) ratio is, however, practically limited, since the image errors at high demagnification would prevent the desired concentration of the radiation on the detector surface. When utilizing mirror optical systems of the type customary in the infrared technique and the aperture ratios (i.e., $f$ numbers) commonly used, this practical limit is at an image reduction ratio of about 1:6.

It is known to achieve a further reduction in effective image size by the application of the technique of using a "light pipe," especially one of conical shape. For this purpose, a light pipe member is employed which tapers towards one end. The beam of rays to be measured will be caused to enter the larger entrance opening of the light pipe member in a concentrated manner. For instance, the exit slit of a spectrometer will be reduced in a 1:6 ratio and imaged on this entrance opening. The detector is behind the smaller (exit) opening of the conical light pipe member; and the light entering the light piping member will reach the detector after single or multiple reflection on the internally reflecting walls of the light pipe member. The reduction ratio of the conical light pipe member is limited by the fact that if a too strong reduction ratio is attempted a portion of the radiation will again leave the light pipe member through the entrance opening thereof instead of reaching the exit opening.

If $A$ is the spread half-angle of the radiation entering into the conical light pipe member, $B$ the spread half-angle of the radiation emerging from the light pipe member (both measured from the optical axis), $D$ the diameter of the large entrance opening and $d$ the diameter of the smaller exit opening of the conical pipe, then approximately:

$$\sin A / \sin B = d/D$$

Therein, $B$ may have a theoretical maximum of $90°$, that is, the detector could be illuminated from the total half space. For this limiting case:

$$\sin A = d/D$$

The reduction ratio obtainable, without a portion of the radiation being eventually reflected back to the entrance opening and thus being lost, therefore depends on the spread angle of the incoming radiation. Even with a relatively great value of $A=30°$, however, an additional reduction ratio of 1:2 (thus a reduction of the necessary detector surface area to $\frac{1}{4}$) may be obtained with a conical light pipe member.

The expression "conical," as herein used, is intended to mean that the exit opening is smaller than the entrance opening of the light pipe member, without necessarily denoting that the cross-section of the light piping member is circular. The theory of condenser-type optical systems with conical light pipe members is described, for instance, in "Journal of the Optical Society of America" volume 42, No. 10, (October 1952), pages 712 to 715.

The efficiency of such light pipe type optical systems for concentrating radiation on a detector assumes that the detector essentially completely intercepts all of the radiation emerging from the exit opening ($B \approx 90°$). However, certain existing types of radiation detectors cannot be arranged directly behind (i.e., essentially in the plane of) the exit opening of the light pipe member because the absorbing surface is enclosed in an evacuated housing closed off by a transmitting window. These are primarily thermal detectors. There do also exist detectors utilizing a gas filled chamber, wherein there will be a heating of the gas and thus an increase in pressure due to the absorption of the radiation. This causes a diaphragm to deform, and such deformation is then determined. In a prior art radiation detector of this type, the Golay-detector (see U.S. Letters Patent No. 2,557,096), the deformation of the diaphragm is determined optically. For this purpose the diaphragm is made reflecting on the back thereof; and this reflecting diaphragm is located in a path of a set of rays ultimately impinging upon a photocell, which path of rays is optically influenced by such deformation. In this type of detector the absorption of the radiation may take place at a separate absorbing diaphragm positioned near the center of the gas chamber which transmits the heat to the gas on both sides thereof. The photocell supplies an output signal which depends on the absorbed radiation energy.

With such detectors or other detectors closed off by a window, a condenser-type optical system with conical light piping member could not practically be realized prior to the present invention, since the light pipe can only be advanced as far as the outer surface of the window and thereby becomes relatively small. The absorbing surface of the detector is spaced from the exit opening of the light piping member and therefore detects only a relatively small solid angle. Therefore, the ratio $d/D$ becomes relatively great according to the first above formula for a particular spread half-angle $A$ of the incident light, if the greatest portion of the radiation is to reach the absorbing diaphragm, rather than to be lost either by reflection back to the entrance opening or by failure of the radiation emerging from the exit opening to impinge upon the absorbing surface (i.e., to pass beyond the edges of this surface).

It is the object of the present invention to provide a condenser-type optical system utilizing a conical light pipe member in conjunction with radiation detectors of the type comprising an outer window spaced from the actual detecting surface.

The object of the invention is accomplished in conjunction with a radiation detector which is closed off in a known manner by a window, by providing that window with a surrounding internally mirrored surface or tube acting itself as a light pipe member.

In such manner the window itself acts as an auxiliary or extending light pipe member; and it is possible to direct the light, practically without any losses, onto the absorbing surface of the detector. The window may have a continuously uniform cross-section (in all planes perpendicular to the optical axis), for instance, circular or square; and the internally mirrored surface or tube therearound directs the light (already concentrated by the cone arranged thereinfront), in the manner of a simple light pipe without any further effective image reduction or radiation beam concentration. Alternatively, the window itself may have a basically conical shape. Then such window axial shape and its circumferential reflecting surface or tube will effect a further effective image reduction or radiation concentration. In a Golay or similar detector, the internal walls of the detector chamber or housing may additionally be made mirror-like (i.e., reflecting).

The advantages of the invention and the various manners in which it may be effected in conjunction with somewhat different detectors of the type having spaced outer windows will be obvious to one skilled in the art upon reading the following detailed specification in conjunction with the accompanying drawings, in which:

FIGS. 1–4 are schematic cross-sectional views, taken through the optical axis, of four different but somewhat similar embodiments of the invention as used in conjunction with a Golay-type of radiation detector.

In FIG. 1 there is shown the absorbing diaphragm 10 of a Golay type of detector 12, which diaphragm separates gas chamber 14 in detector block 16 into two sub-chambers in a gas-tight manner. The left side of chamber 14 is closed off by a transmitting window 18. Chamber 14 is filled with gas and tightly sealed. If radiation passes through window 18 into chamber 14 and strike absorbing diaphragm 10, the gas will be heated due to the absorbed energy and expand. This causes the mirror-diaphragm (not shown) to be deformed and influence a path of rays striking a photocell or the like. This is known per se and is therefore not illustrated further. (See the above-mentioned Patent No. 2,557,096, in which the gas chamber is at 14, the absorbing diaphragm at 18 and the window at 12, in FIGS. 1 and 2 of that patent.)

To operate with a small detector surface, the incident beam of radiant energy (to be measured) is concentrated by means of a conical light pipe member on the detector surface 10. In the embodiment of FIG. 1, a funnel-shaped light pipe member 20 with a mirrored internal surface is positioned in front of window 18. The smaller exit opening thereof corresponds to the entrance aperture of window 18. In this embodiment the window 18 is also made conical and is provided with a mirrored or reflecting surface 22 to act as an auxiliary funnel-shaped mirror. The window 18 is arranged in an opening of housing 16, and is sealed in this opening, which tapers so as to mate with the outer surface of window 18, by a cement ring. The cylindrical internal surface of chamber 14 is also mirrored. Because of the shape and reflective properties of the conical surfaces of elements 20 and 18 and the cylindrical surface of chamber 14, the incoming radiation will be passed through window 18 and further through chamber 14 to be directed onto diaphragm 10 without any appreciable loss thereof. Window 18 with mirrored surface 22 at the same time effects an additional effective image size reduction (i.e., concentration of the energy into a narrower beam).

Figure 2:
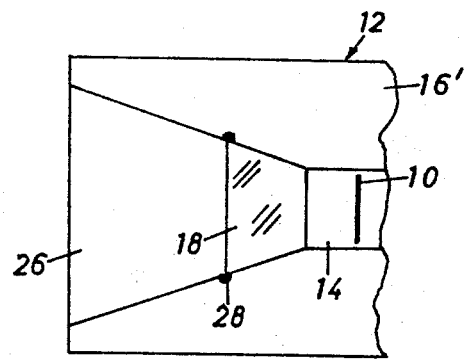

In the embodiment according to FIG. 2, the conical light pipe member is in the form of a funnel-shaped internally mirrored opening 26 in long housing 16'. In the rear portion of opening 26 a conical window 18, substantially identical to that in FIG. 1, is inserted and sealed as at 28 by a cement ring. This version is essentially identical to that of FIG. 1 as far as function is concerned.

Figure 3:
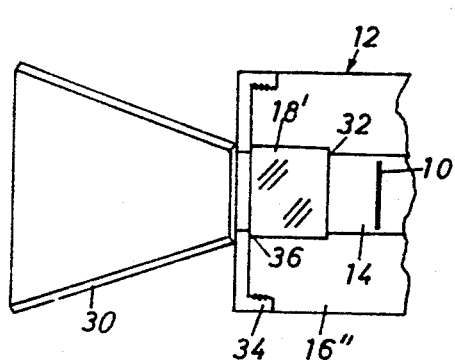

FIG. 3 shows an arrangement with non-conical (i.e., cylindrical) window 18'. In this embodiment the effective image reduction (i.e., beam concentration) is effected by means of a funnel-shaped light pipe member 30 arranged in front of the window. Window 18' is located in an enlargement of the bore forming cell 14 and is supported against a shoulder 32 of housing 16'', where a cement seal is provided. At its front window 18' is held by a threaded retaining ring 34 and forced against the cement seal at 32. A cement seal may also be provided between retaining ring 34 and the front edge of window 18' as at 36 in FIG. 3.

Frequently, cement has a distinct reflection spectrum. Experience has taught that this may become quite disturbing if radiation reflected on the cement reaches the detector diaphragm 10. Such reflections may be avoided by incorporating a small "step" in the shadow of which the cement surface is located. To provide such a step, for instance in FIG. 1, the exit opening of the conical light piping member 20 may be made slightly smaller than the entrance opening of window 18. In FIG. 3 the cement surface 36 is located in the shadow of the inner rim of the threaded retaining ring 34.

Figure 4:
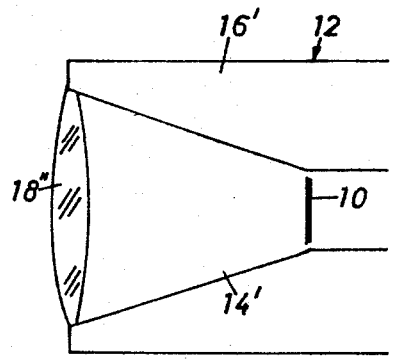

In the embodiment according to FIG. 4, the window is in the form of a field lens 18'' closing off the conically shaped and internally mirrored wall forming chamber 14'; as shown in this figure, the field lens 18'' may be inserted slightly into and sealingly attached to the entrance (left) end of the housing 16' forming conical chamber 14'. The reduction in the effective image size (or concentration of beam energy) does not therefore occur until the radiation actually enters chamber 14' itself of detector 12.

By means of the application of an improved conical light pipe member of the type herein described, substantial advantages in radiation measurement are obtained. At very small expense an optimum of possible image reduction and satisfaction of the sine condition may be attained. With conventional optical imaging systems only approximation is possible. In addition it is assured that the detector surface is uniformly struck by the measured radiation, since the exit opening is practically uniformly illuminated by multiple reflections in the light pipe member (i.e., the conical light pipe averages or integrates the energy so as to cause substantially uniform radiation intensity at its small exit end, even if the intensity of the beam at its large entrance end is quite variable in distribution). Other advantages and minor modifications of the invention will be obvious to one skilled in the art; for this reason the invention is not limited to the details of any of the four disclosed embodiments, but rather is defined solely by the scope of the appended claims.

I claim:

1. In a condensing system including a conical light pipe member for concentrating a radiant energy beam on a radiation detector of the type having an enclosure sealed by a transparent window and having the detector element, receiving and responsive to the radiant energy to be measured, within said enclosure and substantially behind said window, the improvements comprising:

a reflective means substantially completely surrounding said window;

said reflecting means thereby causing said window to act also as a further light pipe between said conical light pipe member and said detector element.

2. A condensing optical system according to claim 1, in which:

said window is substantially conical in shape;

so that said reflective means forms an auxiliary conical light pipe.

3. A condensing optical system according to claim 1, in which:

said radiation detector is a Golay detector.

4. A condensing optical system according to claim 1, in which:

said detector element is substantially spaced from said window; and said reflective means further comprises mirrored surfaces on substantial portions of the internal walls defining said detector enclosure.

5. A condensing optical system according to claim 1, in which:

said window has at least one curved optical surface so as to act as a field lens in the entrance opening of the conically shaped walls defining said detector enclosure.

6. A condensing optical system according to claim 1, in which:

said window is sealed into the detector housing by cement;

said cement being positioned behind a step in the adjacent structure so as to eliminate any incoming radiant energy from both impinging upon the cement and then subsequently reaching said detector element.

7. A condensing optical system according to claim 1, in which:

said reflective means extends substantially completely along the interior surface of said enclosure in the whole axial dimension between the exit end of said conical light pipe member and said receiving detector element;

whereby said conical light pipe member is effectively extended up to said detector element.

8. A condensing optical system according to claim 1, in which:

said reflective means comprises a substantially conical portion.

9. A condensing optical system according to claim 1, in which:

said reflective means comprises a substantially cylindrical portion.

10. A condensing optical system according to claim 1, in which:

said reflective means comprises both a substantially conical portion and a substantially portion.

References Cited

UNITED STATES PATENTS

| | | | |
|---|---|---|---|
| 1,781,800 | 11/1930 | Baird | 250—216 X |
| 2,557,096 | 6/1951 | Golay | 250—231 X |
| 2,765,411 | 10/1956 | Kerr | 250—227 X |
| 3,238,373 | 3/1966 | Orloff | 250—216 |
| 3,271,575 | 9/1966 | Falbel | 250—216 |
| 3,293,432 | 12/1966 | McCall et al. | 250—227 X |

WALTER STOLWEIN, *Primary Examiner.*

U.S. Cl. X.R.

250—227